March 4, 1969     M. D. JOHNSON     3,431,556
DECELERATION WARNING SIGNAL SYSTEM
Filed March 15, 1966
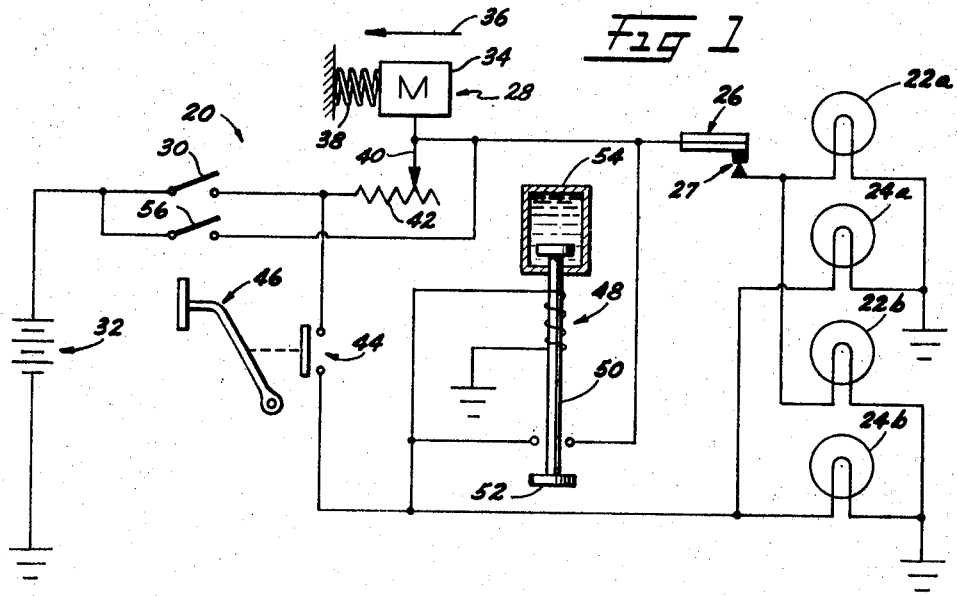
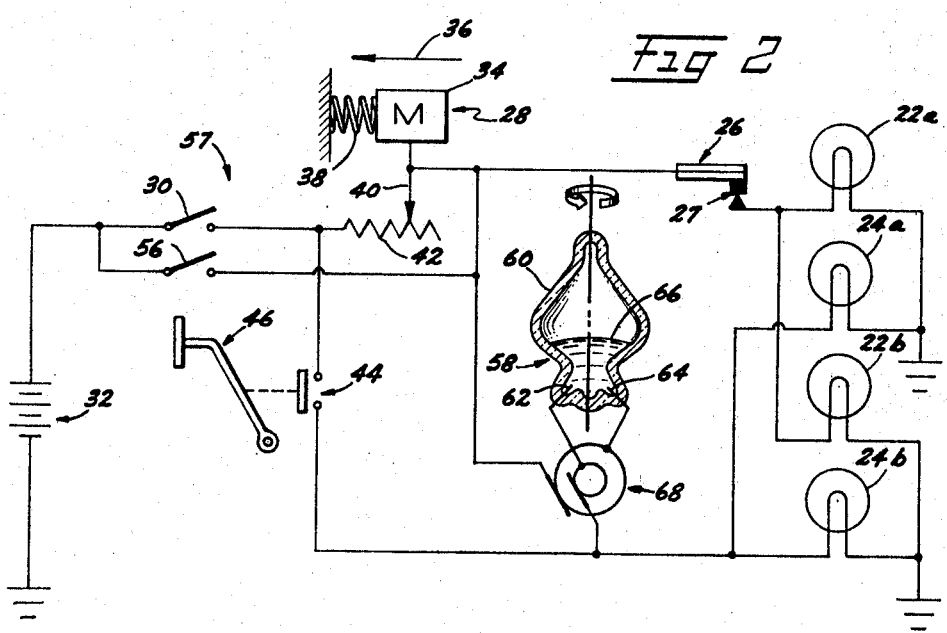
INVENTOR.
MARVIN D. JOHNSON
BY
Meyers & Peterson
ATTORNEYS United States Patent Office 3,431,556
Patented Mar. 4, 1969

3,431,556
DECELERATION WARNING SIGNAL SYSTEM
Marvin D. Johnson, 5507 23rd Ave. S.,
Minneapolis, Minn. 55417
Filed Mar. 15, 1966, Ser. No. 534,372
U.S. Cl. 340—72       10 Claims
Int. Cl. B60q 1/44

ABSTRACT OF THE DISCLOSURE

A deceleration warning signal system for indicating the deceleration of a vehicle, the vehicle having a source of electrical energy, the system comprising a signal lamp, a flasher switch, and a variable resistance means connected in series with the energy source, the flasher switch being of the current responsive type in which the rate of flashing is dependent on the magnitude of the current flowing therethrough, the variable resistance means being responsive to the deceleration of the vehicle to reduce the resistance in proportions to the rate of deceleration of the vehicle. In this system, the current through the flasher switch and the signal lamp increases with increasing deceleration, with a corresponding increase in flashing rate and the observed light intensity.

---

This invention relates to warning signal systems for automotive vehicles and the like. More particularly, the invention pertains to a warning signal system for providing an indication of the fact that a vehicle is decelerating and also of its rate of deceleration.

The conventional brake light system gives an indication to a following driver simply that the brakes are being applied. No indication is ordinarily given that the vehicle is decelerating without application of the brakes, and no information as to the rate of deceleration is normally given. It is an object of this invention to provide a warning signal system in which all of these factors are indicated.

It is another object of the invention to provide a warning signal system which is highly intelligible to following drivers. In this regard, the signal given by the system is a flashing signal which increases in light intensity and flashing rate with increased deceleration. The urgency of action required in response to such a signal is readily comprehended.

Still another object of the invention is to provide a warning signal system capable of operation as outlined above and which in addition can be used as an emergency parking signal to flash the indicator lamps when the vehicle is in a stopped condition.

Other objects and advantages of the present invention will become apparent from a reading of the following detailed description when taken in conjunction with the accompanying drawings wherein:

FIGURE 1 is a schematic diagram of the system of the invention according to one embodiment thereof; and FIGURE 2 is a schematic diagram of a second embodiment of the invention.

The warning signal system according to the embodiment illustrated in FIGURE 1 is indicated generally by the reference numeral 20. System 20 employs two sets of signal lamps 22a and 24a and 22b and 24b which may be disposed in suitable housings at the rear of the vehicle. More or fewer lamps may be employed, of course.

Lamps 22a and 22b are employed to signal the fact that the vehicle is decelerating, as well as the rate of deceleration thereof. For this purpose, lamps 22a and 22b are connected in parallel with each other and in series with a flasher switch 26, having contacts 27, a decelerometer 28, a switch 30 which may be the ignition switch of the vehicle, and a battery 32, which may be the conventional power source in the vehicle. Flasher switch 26 is preferably of the bimetallic type commonly employed in turn indicator systems. As such, it is responsive to the amount of current flowing in the circuit and will change the rate of opening and closing of contacts 27 in response to variations in current.

Decelerometer 28 may take various forms and as generally shown includes an inertial mass 34 movable in the direction of the arrow 36 upon the occurrence of a deceleration of the vehicle. Motion of mass 34 is opposed by a spring 38 so that the distance through which mass 34 moves will be proportional to the rate of deceleration. A movable tap 40 of a variable resistor 42 is connected to mass 34 so as to be moved thereby, the arrangement being such that the resistance in the series circuit to lamps 22a and 22b is decreased with increasing deceleration. In the absence of deceleration, the resistance of resistor 42 holds the current to a level below that required to light lamps 22a and 22b, although it will be understood that other means, such as a switch not shown responsive to initial motion of mass 34, may be used to extinguish lamps 22a and 22b when mass 34 is in its rest position.

Lamps 24a and 24b are comparable to ordinary "stop lights" in that the are directly responsive to the application of the vehicle's brakes. Lamps 24a and 24b are in parallel with each other and in series with a switch 44, mechanically actuated by a brake pedal 46 in the usual manner, and with the ignition switch 30 and battery 32.

Another feature of the system 20 is a means for overriding decelerometer 28 at some time after the brakes are applied. In the FIGURE 1 embodiment, this means takes the form of a time delay relay 48 having an armature 50 for actuating a switch contact 52. Motion of armature 50 is opposed by a dashpot 54 so that contact 52 will close some time after relay 48 is energized by the operation of brake switch 44. Closure of contact 52 creates a bypass circuit around decelerometer 28 so that maximum flashing rate and intensity are achieved when contact 52 closes.

System 20 is also provided with a manual switch 56 for actuating lamps 22a and 22b as emergency signals when the vehicle is stopped. Switch 56 is directly in series with battery 32 and with lamps 22a and 22b through flasher switch 26, so that the lamps can be lit when the ignition is off.

In the operation of signal system 20 under normal conditions, switch 30 will be closed upon starting of the engine of the vehicle in the usual manner. With the vehicle at rest, or under accelerating conditions, the resistance offered by resistor 42 will prevent operation of flasher switch 26 and of lamps 22a and 22b.

If deceleration takes place without application of the brakes of the vehicle, as by the operator's releasing of the accelerator, inertial mass 34 will respond to reduce the resistance offered by resistor 42. The resulting increased current will light lamps 22a and 22b and actuate flasher switch 26. The light intensity and the flashing rate will vary with the degree of deceleration as mentioned above. Lamps 24a and 24b and time delay relay 48 will remain inoperative during these circumstances.

When the brakes are applied to decelerate the vehicle, all four lamps will be operative. Lamps 24a and 24b respond directly to brake switch 44, and lamps 22a and 22b initially respond to motion of inertial mass 34 as described above. At the time switch 44 is closed, however, current is applied to relay 48 so as to cause it to start to close. After the expiration of the delay produced by dashpot 54, contact 52 closes and flasher switch 26 and lamps 22a and 22b are then operated independently of decelerometer 28. Thus, as is usually the case, the rate of deceleration decreases after an initial increase, but the system does not indicate this decrease. Instead, the maximum intensity and flashing rate are maintained after the vehicle brakes have been applied for a predetermined time.

After a stop has been completed, the brake will ordinarily be released and switch 44 will then be opened to extinguish the lamps. Switch 56 may thereafter be actuated to flash lamps 22a and 22b as an emergency signal, if desired.

In the embodiment of FIGURE 2, the signal system is generally indicated at 57. System 57 is the same as system 20 except for the means for overriding the decelerometer 28, which means in this case takes the form of a centrifugal switch 58. Centrifugal switch 58 is connected to some rotatable part of the vehicle, such as a speedometer cable or the like, so as to be rotated thereby, and is arranged to be open when the vehicle is moving above a predetermined speed.

Centrifugal switch 58 is generally conventional per se and consists of an insulating envelope 60, shaped as shown, a pair of contacts 62 and 64 and a mercury pool 66. As envelope 60 is rotated about the vertical axis, the centrifugal forces developed in mercury pool 66 cause the mercury to rise and, eventually, as the rate of rotation exceeds a predetermined amount, electrical communication between contacts 62 and 64 will be broken. Below this speed, the contacts 62 and 64 will be in communication through mercury pool 66. A commutator 68, such as a slip ring commutator, may be employed to connect centrifugal switch 68 with the balance of the circuitry mounted on the fixed parts of the vehicle.

The operation of system 57 is the same as that of system 20 except for operation during braking. In system 57, decelerometer 28 is bypassed when the speed of the vehicle reaches the speed at which centrifugal switch 58 closes rather than after a predetermined time interval. All other sequences of operation are the same.

It should now be apparent that a deceleration warning signal system has been described which fulfills the objects of invention set forth hereinabove. Of course, there are modifications and variations of the systems described herein which will occur to those skilled in the art having the benefit of this disclosure. It is to be understood, therefore, that within the scope of the appended claims the invention may be practiced otherwise than as herein described.

I claim:
1. A deceleration warning signal system for indicating deceleration of a vehicle which has a source of electrical energy the system comprising a signal lamp, a flasher switch and a variable resistance means connected in series with said source, said flasher switch being of the current reponsive type in which the rate of flashing operation is dependent on the magnitude of the current flowing therethrough, said variable resistance means being responsive to deceleration of said vehicle to reduce the resistance thereof in proportion to the rate of deceleration of said vehicle, whereby the current through said flasher switch and said signal lamp increases with increasing deceleration with a corresponding increase in flashing rate and light intensity.

2. A deceleration warning signal system as defined in claim 1 further comprising a manual switch connected in parallel with said variable resistance means for actuating said signal lamp as an emergency signal.

3. A deceleration warning signal system as defined in claim 1 particularly adapted for use in a vehicle having a braking system, said warning signal system further comprising circuit means for automatically bypassing said variable resistance means at a time after actuation of said braking system.

4. A deceleration warning signal system as defined in claim 3 adapted for use in a vehicle having an electrical switch in series with said source which is closed upon actuation of said braking system, said bypass circuit means including a time delay relay responsive to closing of said electrical switch, said time delay relay having a switch closing said bypass circuit means after the expiration of a predetermined time interval.

5. A deceleration warning signal system as defined in claim 3 wherein said bypass circuit means includes a speed responsive switch having means for closing said bypass circuit means when said vehicle in travelling below a certain speed and for opening said bypass circuit means when said vehicle is travelling above said speed.

6. A deceleration warning signal system as defined in claim 5 wherein said speed responsive switch is a centrifugal switch coupled to a part of said vehicle which rotates at a speed proportional to the speed of said vehicle.

7. A deceleration warning signal system as defined in claim 1 particularly adapted for use in a vehicle having a braking system and an electrical switch in series with said source and closed upon actuation of said braking system, said warning signal system further comprising a second signal lamp connected in series with said electrical switch.

8. A deceleration warning signal system as defined in claim 7 further comprising circuit means for automatically bypassing said variable resistance means at a time after actuation of said braking system.

9. A deceleration warning signal system as defined in claim 8, said bypass circuit means including a time delay relay responsive to closing of said electrical switch, said time delay relay having a switch closing said bypass circuit means after the expiration of a predetermined time interval.

10. A deceleration warning signal system as defined in claim 8, said bypass circuit including a centrifugal switch coupled to a rotating part of said vehicle which rotates at a speed proportional to the speed of the vehicle, said centrifugal switch having means for closing said bypass circuit means when said vehicle is travelling below a certain speed and for opening said bypass circuit means when said vehicle is travelling above said speed.

References Cited
UNITED STATES PATENTS

| 2,547,199 | 4/1951 | Dezzani | 200—52 |
| 2,982,944 | 5/1961 | Weller | 340—52 |
| 3,069,623 | 12/1962 | Murgio | 324—70 |

JOHN W. CALDWELL, Primary Examiner.

ALVIN H. WARING, Assistant Examiner.

U.S. Cl. X.R.

340—66, 262; 200—61.45